(12) United States Patent
Stobart (10) Patent No.: US 7,526,302 B2
(45) Date of Patent: Apr. 28, 2009

(54) METHOD OF SYNCHRONIZING A MOBILE STATION WITH A BASE STATION

(75) Inventor: Christopher Stobart, Nuremberg (DE)

(73) Assignee: DSP Group Switzerland AG, Zurich (DE)

( * ) Notice: Subject to any disclaimer, the term of this patent is extended or adjusted under 35 U.S.C. 154(b) by 287 days.

(21) Appl. No.: 10/479,088

(22) PCT Filed: May 29, 2002

(86) PCT No.: PCT/IB02/01940

§ 371 (c)(1),
(2), (4) Date: Nov. 25, 2003

(87) PCT Pub. No.: WO02/098022

PCT Pub. Date: Dec. 5, 2002

(65) Prior Publication Data

US 2004/0157631 A1    Aug. 12, 2004

(30) Foreign Application Priority Data

May 31, 2001    (DE) ............................... 101 26 420

(51) Int. Cl.
*H04B 7/00* (2006.01)
(52) U.S. Cl. ...................... 455/502; 455/13.2; 455/208; 370/304; 370/324; 370/350; 370/510; 370/512
(58) Field of Classification Search ................. 455/522, 455/69, 13.2, 502, 208; 370/304, 324, 350, 370/503, 509, 510, 512–514, 450
See application file for complete search history.

(56) References Cited

U.S. PATENT DOCUMENTS

| | | | | |
|---|---|---|---|---|
| 5,561,852 A | * | 10/1996 | Heeschen et al. | 455/509 |
| 6,965,586 B1 | * | 11/2005 | Maruyama | 370/335 |
| 2002/0064211 A1 | * | 5/2002 | Chen et al. | 375/149 |

* cited by examiner

*Primary Examiner*—Duc Nguyen
*Assistant Examiner*—Dominic E Rego
(74) *Attorney, Agent, or Firm*—Davidson, Davidson & Kappel, LLC (57) ABSTRACT

The invention relates to a method of synchronizing a mobile station with a base station in a wireless communications system, to a mobile station for a wireless communications system, as well as to a wireless communications system of this kind. In order to enable faster ultimate synchronization, it is proposed to compare components of the received data not only with a stored synchronization pattern, but also with a stored identification pattern prior to the adaptation of the timing of the mobile station to received data. Already before the synchronization it can thus be determined with a high degree of probability whether received data originates from a desired base station or not. The necessity of checking the contents of packets which are not associated with a desired base station can thus be avoided. Moreover, because of such preliminary checking, it is no longer necessary either to reset the timing of the mobile station after synchronization on the basis of data which later appear to originate from another base station.

12 Claims, 3 Drawing Sheets

METHOD OF SYNCHRONIZING A MOBILE STATION WITH A BASE STATION

The invention relates to a method of synchronizing a mobile station with a base station in a wireless communications system, to a mobile station for a wireless communications system, and to a wireless communications system of this kind.

Wireless communications systems which include at least one base station and at least one mobile station are known from practice, that is, notably for wireless communication in locally restricted areas. An example of a wireless communications system is the DECT (Digital Enhanced Cordless Telecommunications) system which is described inter alia in ETSI EN 300 175: "Digital Enhanced Cordless Telecommunications, Common Interface".

On the one hand, 10 different frequencies are available for the transmissions in a DECT system. On the other hand, the transmission time is subdivided into frames, each of which comprises 24 time slots. Each combination of a given frequency and a given time slot constitutes a radio channel which can be used for transmissions by a base station or a mobile station. In order to enable communication to be started between a mobile station and a base station in a DECT system, it is necessary to synchronize the mobile station first with the base station with which it is associated. To this end, in a first step the mobile station must find the radio channel used by the relevant base station; in this respect it is to be noted that the mobile station can in most cases receive signals from a plurality of base stations. The mobile station will also transmit at the frequency of said radio channel, be it offset by 12 time slots. The timing of the mobile station can then be adjusted on the basis of the signals received via said radio channel in a second step in such a manner that it corresponds to the timing of the base station. The changing of the time slots in the mobile station is thus tuned to the changing of the time slots in the base station.

Figure 1:
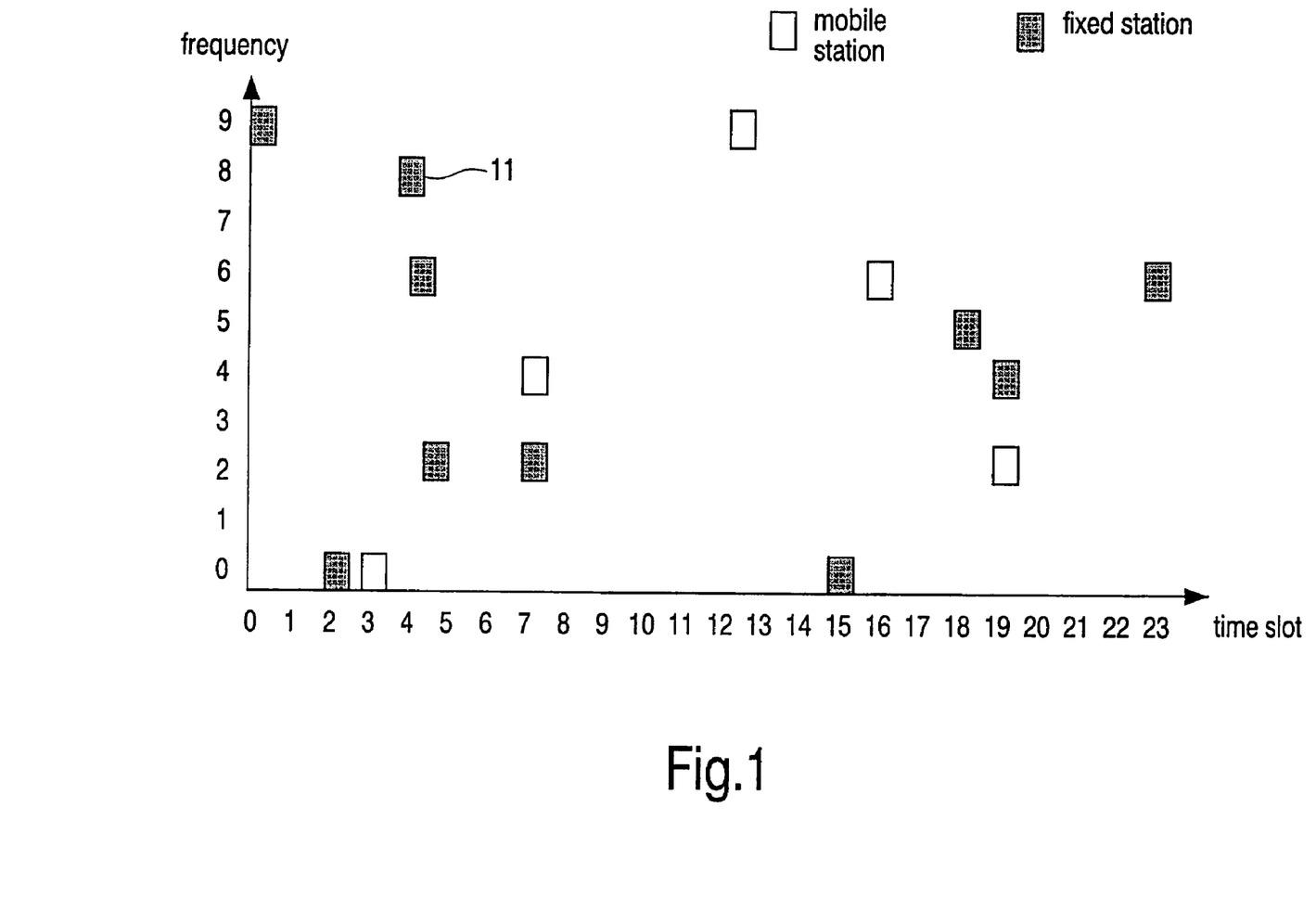
FIG. 1 shows a typical radio environment for a DECT mobile station.

For the purpose of illustration FIG. 1 shows a typical radio environment of a mobile station on the basis of a co-ordinate system. The radio environment is composed of the signals from various mobile stations and base stations within the range of the mobile station considered. The x-axis of the co-ordinate system is subdivided in conformity with the configuration of the time slots 0 to 23 used by the mobile station concerned prior to synchronization. The 10 different frequencies 0-9 of the system are plotted on the y-axis of the co-ordinate system. Dark rectangles in the diagram represent radio channels instantaneously used by base stations and bright rectangles represent channels instantaneously used by mobile stations.

In the situation illustrated in the figure, transmissions take place by ten different base stations, each station utilizing a different channel. Five of the transmissions by base stations as shown form part of a duplex connection which is associated each time as a respective second part with the mobile station transmissions which are also shown. The mobile stations transmit at the same frequency as the associated base station, but 12 time slots after said base station. The channels shown are allocated only approximately a given time slot on the x axis, because the time slots used by the various stations usually do not correspond to the time slot of the relevant mobile station for which the co-ordinate system was conceived.

The mobile station under consideration itself does not use any channel yet for the transmission. For a synchronization so as to establish communication, the mobile station must search the radio channel of the base station associated with the mobile station. It is assumed that in this case this is the channel 11 with the carrier frequency 8 in the vicinity of the time slot 4 of the mobile station.

A procedure which is known from practice will now be described for the determination of this channel.

The mobile station first measures the received signal strength, notably a RSSI (received signal strength indicator) on all 240 channels in question. Subsequently, it activates its receiver successively for each of the channels, that is, in the order of the signal strengths measured and starting with the channel with the strongest signal. In the environment shown in FIG. 1 at least 15 channels exhibit a signal strength that can be measured and must, therefore, be tested by the mobile station. Because the time slots of the relevant station do not correspond to those of the searching mobile station, measurable signal strengths may also be detected partly in two time slots of the searching mobile station, so that the total number of channels to be tested may become larger than the number of actual transmissions.

Figure 2:
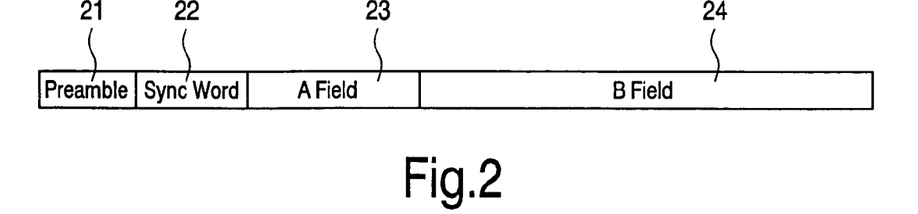
FIG. 2 shows the format of a DECT packet.

The signals transmitted by a base station or a mobile station and received by the searching mobile station in the DECT system have the form of a DECT packet which is shown in FIG. 2, be it not to scale. It is composed of a preamble 21, a synchronization word 22 of 16 bits, an A field 23 and possibly a B field 24. When the searching mobile station receives a synchronization word 22, it can adapt its local timing to that of the bit and time slot timing of the DECT packet, known on the basis of the word, and hence to that of the transmitting station.

Therefore, for the synchronization the mobile station has to filter packets of the base station associated with the mobile station from the signals received. To this end, the mobile station utilizes a comparison circuit whereby packets of base stations can be recognized on the basis of the synchronization word 22. The synchronization word 22 has a value of 0xE98A in packets of DECT base stations and a value of 0x1675 in packets of DECT mobile stations.

Figure 3:
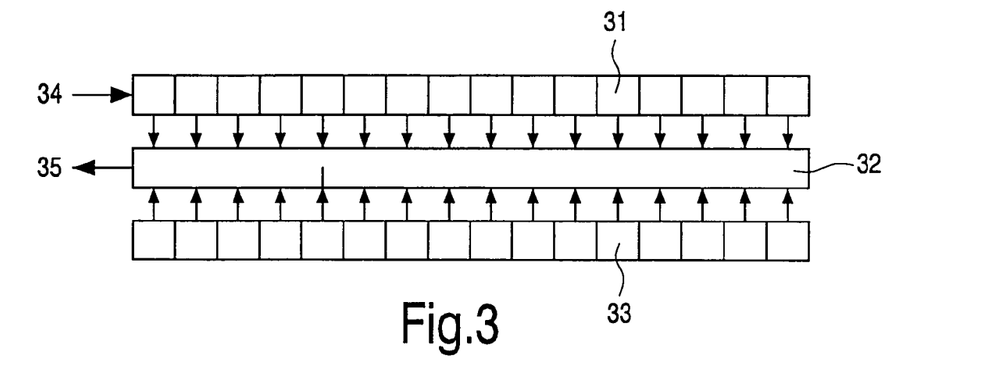
FIG. 3 shows diagrammatically a customary comparison device.

FIG. 3 is a diagrammatic representation of such a comparison device. It includes a 16-bit shift register 31, a comparison circuit 32, and a memory 33 of the mobile station in which the value of the 16-bit synchronization word 22 in packets of base stations is stored. Inputs of the comparison circuit 32 are connected to outputs of the shift register 31 as well as to outputs of the memory 33. The input of the shift register 31 is also connected to the receiver of the mobile station (not shown) and the output of the comparison circuit 32 is connected to a synchronization device which is not shown either. The memory 33 need not form part of the comparison circuit itself; it may also merely be connected to the comparison device.

The data bits 34 which are received at the instantaneous frequency by the receiver of the mobile station are shifted through the 16-bit shift register 31. After each bit 34 newly shifted in, all 16 bits present in the shift register 31 at that instant are transferred to the comparison circuit 32. The comparison circuit 32 also receives the 16-bit synchronization word stored in the memory 33. The respective 16 bits received are then compared in the comparison circuit 32. When the two entries correspond, an output signal 35 which indicates that a synchronization word of a base station has been found is generated.

In order to compensate the deviations in the time slot timing, the receiver and the comparison device of the mobile station are activated for a duration of two time slots for each channel. It is thus ensured that each synchronization word transmitted by a base station is recognized by the comparison device in the mobile station.

Figure 4:
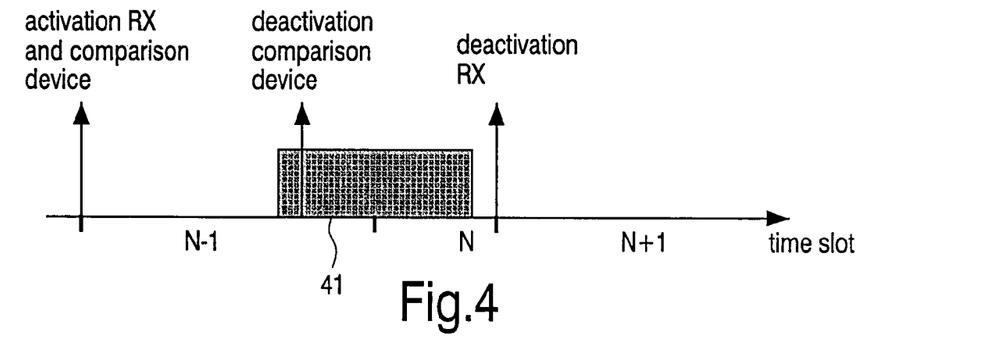
FIG. 4 shows an example of successful detection of a synchronization word.

FIG. 4 illustrates the detection of a synchronization word of a base station over two time slots. In the Figure the activation and the deactivation of the receiver and the comparison device of the mobile station and a received DECT packet 41 are associated with the time slots of the mobile station.

At the beginning of a first time slot N−1 both the receiver and the comparison device of the mobile station are activated. The receiver receives a DECT packet 41 at the adjusted frequency, which packet commences inside the first time slot N−1 and also extends into the second time slot N because of the different timing of the transmitting station and the mobile station in question.

If no synchronization word of a base station is recognized within two complete time slots N−1, N of the mobile station, because either no packet is received at all in these time slots or only a packet of another mobile station, the receiver and the comparison device are deactivated again at the end of the second time slot N. Subsequently, the further search takes place in the two time slots in which the channel with the next-higher measured signal strength may be situated.

However, as soon as data bits are received for which a comparison with the stored synchronization word by the comparison device indicates that the synchronization word associated with the base stations is concerned, the comparison device is deactivated again. Subsequently, the receiver is deactivated, after complete reception of the DECT packet 41 with which the synchronization word received is associated, in conformity with the timing of the synchronization word and hence of the transmitting base station; this means that deactivation does not have to wait for the end of the second time slot N. The deactivation of the receiver brings forward the beginning of the next time slot N+1, so that the local timing of the mobile station is adapted to that of the base station.

Granted, the timing of the mobile station is now adapted to the timing of the base station wherefrom the received DECT packet 41 originates. However, the wrong base station may still be involved, so that prior to the start of communication an identity of the transmitting base station, contained in the A field of the packet 41 received, must be tested by appropriate software of the mobile station.

When the software test reveals that a packet 41 of the base station which is associated with the mobile station is concerned, the mobile station retains the adjusted synchronization and the communication may commence.

Figure 5:
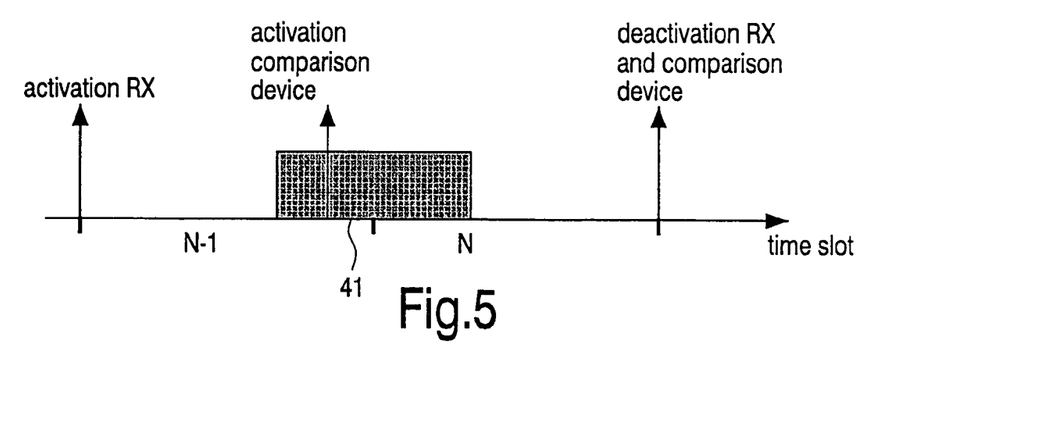
FIG. 5 shows an example of a repeated attempt for the detection of a synchronization word.

However, if the software test reveals that the packet 41 received is a packet from another base station, the previous timing of the mobile station is restored and the search for a packet with a synchronization word from a base station commences anew. The execution of such a new search is shown in FIG. 5 in which the activation and deactivation of the receiver and the comparison of the mobile station as well as the received DECT packet 41 are again associated with the time slots of the mobile station. The further search in this case does not commence with the next time slot N of the list. The receiver instead is activated in the same time slot N−1 as in the preceding search. The comparison device, however, is activated only at an instant in the time slot N−1 as from which the already detected synchronization word from the wrong base station cannot be detected again. Thus, only synchronization words which appear later than the initially recognized synchronization word in this time slot are found. Such repeated testing of the same time slot is necessary because not all-base stations transmit a B field in the DECT packet 41, so that the packets may be significantly shorter than a time slot. For example, up to 9 packets may occur in a period of two time slots.

Each of the described steps requires time and hence increases the total amount of time elapsing before the mobile station is synchronized with the correct base station. In case the searched base station with the channel 11, determined by the frequency 8 and the time slot 4, is tested as the last one in the situation shown in FIG. 1, overall at least ten base stations must be checked. For the first nine checks a subsequent reset of the mobile station to the original timing is required, followed each time first by a renewed attempt in the same time slot. Moreover, five signals from mobile stations are checked. For these signals, however, the correct synchronization word is not found already in the comparison device, so that as a result only the time necessary to check whether the correct synchronization word is present in the data received is added.

The time required before the ultimate synchronization is achieved is substantially increased in the case of a large number of transmitting stations, because every undesirable signal to be checked requires an additional amount of time. Thus, it is a drawback of the known method of synchronizing a mobile station with a base station in a wireless communications system that the synchronization may require a comparatively long period of time.

Moreover, the synchronization word has a length of only 16 bits in DECT systems. The probability of finding this word in noise or in the transmitted data from base stations or mobile stations, therefore, is not insignificant, so that the time required for the synchronization is increased further.

It is an object of the invention to provide a method, a mobile station and a wireless communications system which enable faster synchronization of a mobile station with a base station in a wireless communications system.

On the one hand, the object is achieved by means of a method of synchronizing a mobile station with a base station in a wireless communications system, which method includes the following steps:

transmission of messages by the base station via a given channel which is defined by the frequency and the time slot, at least part of the messages containing a synchronization component and an identification component which identifies the base station, reception of one of the messages by the mobile station, comparison of components of the received message with a stored synchronization pattern and comparison of at least one component of the received message with a stored identification pattern, and synchronization of the timing of the mobile station with the timing underlying the received message if both comparisons have yielded correspondence.

On the other hand, the object is also achieved by means of a mobile station for a wireless communications system. The mobile station comprises first of all storage means for storing a synchronization pattern and an identification pattern which identifies a given base station of the wireless communications system. It also includes a receiving device for receiving messages at a selected frequency. The mobile station also includes a comparison device which is connected to the storage means and the receiving device in order to compare components of a received message with a synchronization pattern which is stored in the storage means and to compare at least one component of a received message with an identification pattern which is stored in the storage means. The mobile station also includes a synchronization device which is connected to the comparison device in order to synchronize the mobile station with a synchronization component of a received message if the comparison device has detected correspondence between components of the message and a stored synchronization pattern and a stored identification pattern.

Finally, the object is also achieved in accordance with the invention by means of a wireless communications system. In addition to at least one mobile station in accordance with the invention, said communications system also includes at least one base station which includes a transmission device for the transmission of messages, at least some of which include a synchronization component and an identification component which identifies the base station.

The invention is based on the idea that the search for a base station by a mobile station in a wireless communications system can be significantly accelerated when the identity of the mobile station transmitting a message is no longer checked after a first tentative synchronization by a software implementation. Therefore, in accordance with the invention the identity of the base station transmitting a message is checked in the same processing step as the acquisition of a valid synchronization component in a message received, that is, prior to the actual synchronization of the mobile station. The invention thus avoids incorrect synchronizations and, with every incorrect synchronization avoided, the necessity of resetting the timing of the mobile station and of searching for suitable synchronization components in received data in the same time slot again is also avoided. Moreover, in conformity with the invention it is no longer necessary to check, by way of a software implementation and after the synchronization, the contents of data packets which do not belong to a desired base station, so that repeated checking of time slots is also avoided in the case where a plurality of packets occurs within a single time slot. Overall, the invention thus enables a reduction of the time required for synchronization.

Granted, for example, in DECT systems each transmitted packet does not contain an identification component. From the cited ETSI document, however, it appears that an identification is contained with a minimum probability of 6.25% in a packet transmitted by a base station, that is, when the base station must transmit paging information and signalization in each frame, and with a maximum probability of 93.75%, that is, when the base station does not have to transmit paging information and signalization. A statistical evaluation of DECT packets in a Philips semiconductor DECT system has revealed that approximately 89% of all packets transmitted by a base station are identity messages. Such messages present can thus be evaluated already prior to a synchronization, thus reducing the overall time required on average for synchronization.

A further advantage of the invention resides in the fact that when a synchronization component as well as an identification component are compared, a larger component of the message must correspond to stored patterns than when merely a synchronization component is compared. The probability of the pattern stored being present by chance in noise or in data from an arbitrary message is thus reduced. The probability that a 16-bit synchronization word is discovered in noise then is once in 65,536 tested bits and hence once in 56,888 ms of continuous testing. Because the search requires at least 100 ms in all time slots, this is a negligibly small effect. However, in the case of an additionally tested identification component of 16 bits, the probability of discovering the combination of the synchronization word and the identification component in the noise is only once in 4294967296 bits and hence once in 62 minutes and 8 seconds of uninterrupted testing.

At the same time the testing of a synchronization component as well as an identification component suffices, with a high degree of probability, for the identification of the correct base station. Assuming a tested 16-bit identification component, on average a base station will have the same 16 bits in the identification component as one in 65536 other base stations. Because the range of the base station is small, that is, a few hundred meters, the probability of encountering two base stations with the same tested identification component in the same geographical environment, therefore, is negligibly small, even though of course steps must also be taken for this case.

Advantageous embodiments of the invention are disclosed in the dependent claims.

The features of the claims 2 to 9 ensure that, in addition to the testing of the identity of a transmitting base station in accordance with the invention, conventional (notably software-based) testing of the identity of a transmitting base station is also possible. This is important in the case where the mobile station is not yet associated with a given base station or the stored identity component is transmitted only infrequently by the base station. It is thus ensured, preferably by way of a switching-over facility, that a channel can be found also in such cases. The synchronization can then take place exclusively on the basis of correspondence between a signal component and the stored synchronization pattern, and a further evaluation of the signals received can subsequently take place in software of the mobile station.

If the assignment of the synchronization component and the identification component to one another in a message is defined, a simultaneous comparison with the stored synchronization pattern and the stored identification pattern could take place, for example, by way of a correspondingly long shift register into which the bits of the message received are sequentially entered and which is capable of applying all bits received to a comparison circuit in one operation. Preferably, however, in conformity with the features of the claims 3 and 8 two comparison means are used for the comparison of the two patterns. This offers the advantage that the confirmation of the correspondence of the synchronization component is separately available for further use. Such a separate confirmation is used to check given radio signals such as so-called "bit slicers". In that case the comparison means may include notably a shift register and a comparison circuit which compares the respective instantaneous contents of the shift register with the memory contents. The result of the comparison means for the component that can be detected ahead in time of the other component can then be applied in a delayed fashion, via a counter, to an AND element which also receives the result of the second comparison means directly. The output value of the AND element thus provides information as regards the correspondence of the two components in a message.

The characterizing part of claim 4 offers the advantage that the checked part of an identification component of a message can be selected in dependence on the system, for example, by way of different lengths of the checked component. This is done notably by checking a header of a field in a message which indicates whether the field contains an identification of the base station, and that further in the field a component of a given length is checked as from a given position. Correspondences in the checked identification component of different base stations can thus also be avoided. The identification component of variable length is also referred to as a PARK (Portable Access Rights Key) in DECT systems.

The characterizing part of claim 5 yields a preferred version of the synchronization in conformity with the invention. While making only minor modifications in the customary method, this version enables the correct base station to be found faster in most cases than by means of the customary methods. The search for the correct channel in the order of signal strength of the channels is then based on the assumption that the mobile station in most cases wishes to contact one of the base stations which are nearest in space. Even when an identification component is not included in each message, the correct channel can be found with a very high degree of probability by setting a given number of repeats for the checking of each channel. The checking of two time slots of the mobile station per channel then ensures that each message is considered completely during a comparison.

The characterizing part of claim 6 yields an alternative, preferred version of the synchronization in accordance with the invention. For example, in a DECT system most messages are transmitted only once or only during a short period of time. Messages which are only occasionally transmitted, therefore, normally will not result again in false correspondence in the case of a second attempt. The only messages which are regularly transmitted are Qt messages, that is, except for identification messages, are Qt messages. These messages, representing system messages, however, have a frequency of less than 1/30 of the identification messages when two different Qt types are used. When four Qt types are used, the ratio is reduced even to 1/60. Therefore, false correspondences will be recognized only in isolated cases. The probability of recognition of a false correspondence twice in succession, therefore, is negligibly small. This effect can again be completely avoided by utilizing the proposed PARK recognition.

The second preferred version, therefore, enables a significant acceleration to be achieved. Even when the base station only rarely transmits an identification, which is not customary, the speed will still be satisfactory. Because the signal strength is not taken into account, the detection will take place without influencing by other systems.

A comparison device implemented on the basis of software is also feasible when the comparison in a comparison device is preferably carried out on the basis of hardware.

These and other aspects of the invention will be described in detail hereinafter with reference to the embodiments and the drawings. Therein.

The FIGS. 1 to 5 have already been described in the preamble of the present description.

The embodiments to be described hereinafter are based on a DECT system in accordance with the invention which includes a mobile station in accordance with the invention which is provided with a receiving device, storage means, a comparison device and a synchronization device.

First the comparison device of the mobile station will be described in detail. This comparison device is shown diagrammatically in FIG. 6.

Figure 6:
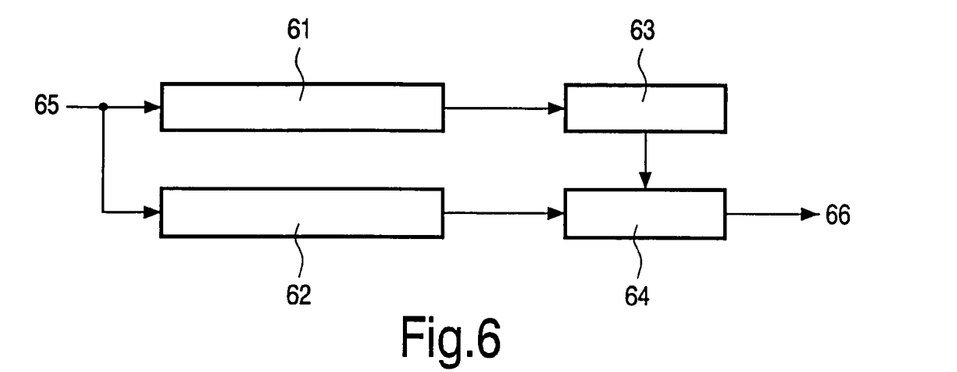
FIG. 6 is a diagrammatic representation of a comparison device of an embodiment of a mobile station in accordance with the invention.

The comparison device includes first comparison means 61 and second comparison means 62. The input of the first comparison means 61 and the input of the second comparison means 62 are connected in parallel to the receiving device (not shown) of the mobile station. The output of the first comparison means 61 is connected, via a counter 63, to a first input of an AND-gate 64 and the output of the second comparison means 62 is connected directly to a second input of the AND-gate 64. The output of the AND-gate 64 in its turn is connected to the synchronization device (not shown) of the mobile station.

Both comparison means receive the data bits 65 which are received by the receiving device of the mobile station. When such data bits 65 originate from a DECT base station, they form part of packets which correspond to the DECT packet shown in FIG. 2; the B field 24 may be present in some of the packets and absent in other packets. In the field provided for this purpose the packets contain a synchronization word 22 and, moreover, in approximately 89% of the packets an identification word in the A field 23, which identification word identifies the base station wherefrom the packet originates.

When the mobile station wishes to start communication with a base station, first the first comparison means 61 are activated. The data bits 65 received are compared with a synchronization pattern which is stored in the mobile station and has the value 0xE98A and hence is identical to the synchronization word of the DECT packets originating from base stations. As soon as a sequence of data bits which corresponds to the stored synchronization pattern is recognized, the counter 63 is started and the subsequent bits 65, originating from the A field of the packet, are applied to the second comparison means 62. When the counter 63 reaches a predetermined value, the sequence of data bits 65 then present in the second comparison means 62 is compared with an identification pattern which is stored in the mobile station. Because of the presetting of the comparison point by the counter 63, the second comparison means 62 need perform only a single comparison.

The result of the comparison in the first comparison means 61 and the result of the comparison in the second comparison means 62 are applied to the AND-gate 64. The supply of the result of the comparison in the first comparison means 61, however, is delayed by the counter 63, so that the two results for a packet simultaneously reach the AND-gate. When the instantaneous data bits 65 in the second comparison means 62 correspond to the identification pattern, via the AND-gate 64 an output value 66 can be output which indicates the correspondence of the synchronization word as well as of the compared identification component in the instantaneous packet with the stored patterns. This triggers synchronization of the mobile station with the synchronization component of the received packet by the synchronization device. Moreover, the software of the mobile station is informed on the positive result. When the instantaneous data bits 65 do not correspond to the identification pattern, the AND-gate 64 outputs an output value 66 which indicates that no double correspondence has been found. Subsequently, the first comparison means 61 resume the search for a synchronization word.

As an alternative for two separate comparison means 61, 62, a single comparison of a correspondingly longer bit sequence could take place. A comparison split into two parts, however, offers the advantage that it utilizes the detection of synchronization words only for the control of given radio signals. A separate signal which indicates exclusively that a synchronization word has been found, therefore, is required in any case.

When the synchronization device receives the information that the comparison was successful, it synchronizes the mobile station in known manner in conformity with the synchronization word. Subsequently, the packet obtained is checked in software whereby, for example, the rare cases can be detected where both the synchronization word and the checked identification component appeared in noise or in data from another base station. At that instant it can also be checked whether the packet does not originate from the base station associated with the mobile station, but from another base station with the same identification component. If no incorrect detection is found in the software either, the adjusted synchronization is maintained and the communication between the mobile station and the base station may commence. When incorrect detection is recognized, the timing of the mobile station must be reset and a search must be undertaken once more for a data packet from the correct base station. Such incorrect detection, however, is so rare that it does not have a significant effect on the mean synchronization time.

Instead of using exclusively a recognized synchronization word so as to trigger the synchronization and subsequently checking the identity of the base station transmitting the synchronization word in software, the mobile station thus is synchronized and the received signal is checked further only if the synchronization word is found and the defined component of the identification word is contained in the A field of a packet received. This means that packets from incorrect base stations are not checked and that the time usually spent on the checking and subsequent resetting of the timing of the mobile station can be saved.

For example, the comparison means which are diagrammatically shown in FIG. 3 can be used as the first comparison means 61 for the comparison of received data bits 65 with the stored synchronization pattern.

The second comparison means 62 for the comparison of received data bits 65 with the stored identity pattern may also be constructed like the comparison means shown in FIG. 3. However, the comparison means 62 are preferably constructed to be such that they enable more flexible determination of the identity of the transmitting base station.

Figure 7:
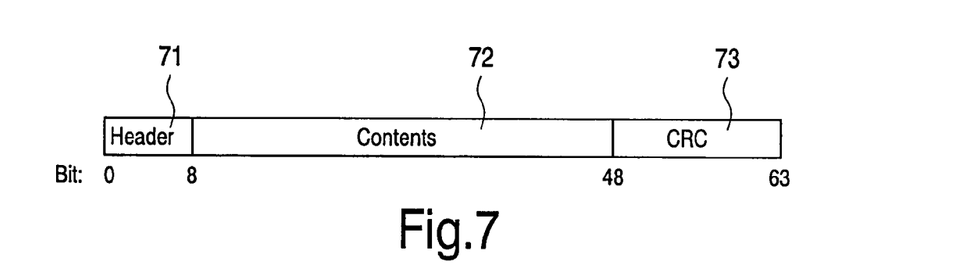
FIG. 7 shows the format of a DECT A field.

In order to illustrate such flexible comparison means, first the incorporation of the identity word in the A field 23 of a DECT packet as shown in FIG. 2 will be described. As is shown in FIG. 7, the A field is composed of a header 71 of 8 bits, a data component 72 of 40 bits and a CRC (Cyclic Redundancy Check) component 73 of 16 bits. The 48 bits of the header 71 and the data component 72 are protected by the 16-bit CRC component 73. The first three bits in the header 71 indicate the type of contents of the data component 72. When an identity message is concerned, the first three bits of the header 71 have a value "011" and the 40 bits of the data component 72 contain an identification of the transmitting base station.

The identification component of a received packet, checked in the second comparison means 62 of FIG. 6, may have an arbitrary length and be situated in an arbitrary position in the A field in the case of a flexible construction of the comparison means. The identification component in that case need not be coherent either.

Figure 8:
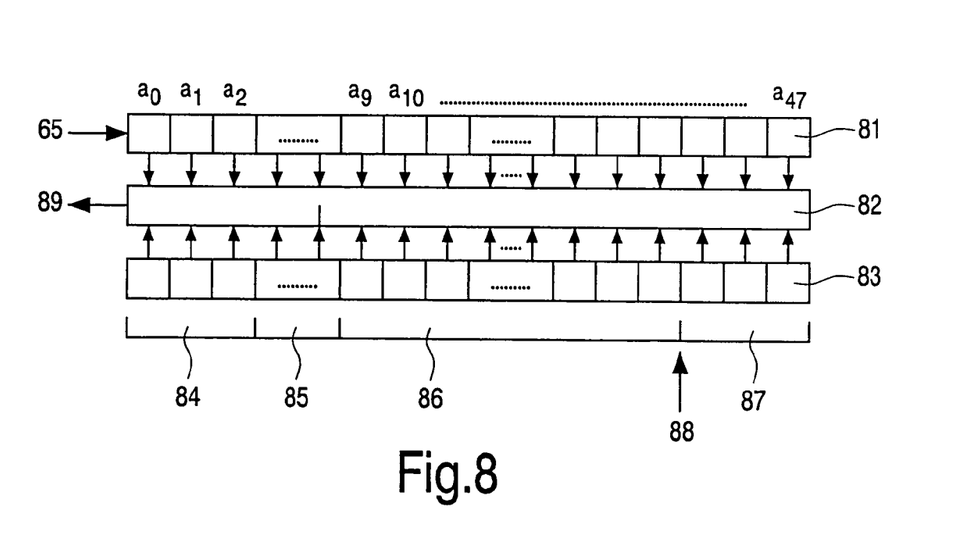
FIG. 8 is a diagrammatic representation of an embodiment of a comparison means of a comparison device for the detection of the identity of a base station in conformity with the invention.

FIG. 8 shows an advantageous embodiment of flexible comparison means 62 of the comparison device of FIG. 6 for the comparison of the identity pattern with an identification component from the A field of a DECT packet as shown in FIG. 7.

The comparison means include a shift register 81 for the intermediate storage of 48 bits $a_0$-$a_{47}$ and a comparison circuit 82. Also provided are storage means 83 in which 42 bits are stored. The storage means 83 may form part of the comparison means or may be general storage means in which further data is additionally stored for other devices of the mobile station, notably for the comparison means 61 for the synchronization word. The input of the shift register 81 corresponds to the input of the second comparison means 62 of FIG. 6 and hence is connected to the receiving device (not shown) of the mobile station. Inputs of the comparison circuit 82 are connected to outputs of the shift register 81 as well as to outputs of the storage means 83. The output of the comparison circuit 82 corresponds to the output of the second comparison means 62 in FIG. 6 and hence is connected to the AND-gate 64 (not shown) of FIG. 6.

After a synchronization word has been detected in a received DECT packet in the first comparison means 61 of FIG. 6, the first 48 bits of the A field of the received packet are sequentially shifted into the second comparison means 62 of FIG. 6, and hence into the shift register 81 of FIG. 8, until all bits of the header and the data component of the A field have been stored in the shift register 81. The instant at which all bits 65 of the A field will have been written is preset by the counter 63 of FIG. 6. The first three bits $a_0$-$a_2$ written into the shift register 81 and the bits $a_9$ to $a_{47}$ are then applied in parallel to the comparison circuit 82. Similarly, the 42 bits stored in the storage means 83 are also applied in parallel to the comparison circuit, the first three bits having the value "011" while the further bits constitute an identification of the desired base station which is identical to the bits $a_9$ to $a_{47}$ in an A field of DECT packets with an identification component of the desired base station.

The comparison circuit 82 of the second comparison means 62 then compares on the one hand the first three bits $a_0$-$a_2$ in the header 71 of the A field, indicating whether the received data 65 concerns an identity message, with the corresponding bits from the storage means 83. As opposed to the first three bits in a first section 84 in the shift register 81, the six bits $a_3$ to $a_8$ in the subsequent section 85 are not applied to the comparison circuit 82 and hence are not checked. A third section 86 contains a bit sequence of a given length of the data component 72 of the A field; this length may be dependent notably on the type of system in which the mobile station wishes to communicate. This variable identity component is also known as PARK and is contained in the bits $a_9$-$a_n$, where n may be between 9 and 47. Because of the variable length of PARK, the comparison circuit 82 must be capable of checking an identity component of variable length. A final section 87 with the bits $a_{n+1}$ to $a_{47}$ again is not checked, the boundary 88 between the third section 86 and the fourth section 87 being different from one system to another. In the example shown in FIG. 8, the bits $a_{45}$ to $a_{47}$ are assigned to the fourth section 87 and hence are ignored during the comparison. If correspondence was found between the received and the stored bits in the sections 84 and 86, a signal 89 which indicates such correspondence is output.

The CRC bits $a_{48}$ to $a_{63}$ need hardly be included in the identity check, because the probability of correspondence of all identity bits with the stored pattern while the CRC sum is wrong is small enough to avoid any significant effect on the result.

The checking of an identity component in received DECT packets already before synchronization, of course, makes sense only when the mobile station already knows the identity of the base station it searches. This is not necessarily the case, for example, during a first presentation of a mobile station or when the base station has the desired identity only as a secondary or tertiary identity; in the latter case the identity can also be transmitted, be it only rarely. In such cases the conventional synchronization is still necessary, provisional synchronization already taking place merely on the basis of a synchronization word found. Therefore, the software of the mobile station includes an option which is capable of switching over, if necessary, between the conventional method and the method in accordance with the invention.

Hereinafter a description will be given of two preferred possibilities for the use of the comparison device of the embodiment shown in the FIGS. 6 and 8 in a mobile station for synchronization with a desired base station when the mobile station is present in the radio environment shown in FIG. 1.

The mobile station must again be synchronized with the base station which utilizes the channel 11 which results from the combination of the frequency 8 and the time slot 4 of the mobile station.

In conformity with a first, preferred alternative the synchronization is realized as in the case of the conventional method described with reference to the FIGS. 4 and 5, except for the fact that a preselection of the channels is already carried out by the second comparison means 62 of the comparison device of the mobile station.

Thus, first the signal strength in the form of the RSSI of all possible channels is measured in the mobile station. Starting from the channel with the strongest RSSI, a check of packets received via the channels is then performed in the comparison device of the mobile station, that is, in the order of the measured RSSI, as described with reference to the FIGS. 6 to 8. The receiving device and the comparison device are then activated each time for up to two time slots. After the correct synchronization word and the correct identification component have been found in a received packet within two time slots, the receiver is deactivated in conformity with the contents of the synchronization word so that the timing of the mobile station is adapted to the timing of the base station. If no correspondence with the stored patterns is found within the two time slots, the next channel is checked. If, after a successful synchronization, it is detected in the software that the selected channel was not the correct channel after all, the same two time slots are checked again; the comparison then commences at an instant within the time slot such that the previously incorrectly determined packet cannot be detected again.

Each channel is checked three times in succession as to whether the desired synchronization word and the desired identification component are present therein, that is, for as long as the correct channel has not been found. Assuming a probability of approximately 89% that an identification word is present in a data packet, the desired base station will be recognized with a probability of almost 99.9% when three attempts are made during the checking of the corresponding channel.

The advantage of this alternative resides in the fact that, because of the second comparison means, the mobile station generally will not be synchronized with a base station with which it is not associated. The time required for the checking of channels of other base stations after successful synchronization in other conventional methods is thus saved. Granted, all channels having an RSSI higher than that of the desired base station must still be checked prior to successful synchronization as before. However, in the presence of more than one transmitting base station in the radio environment of the mobile station, the overall amount of time lost is significantly smaller than in the case of the conventional method, because neither an identity check by the software nor a regular resetting of the timing of the mobile station is required. This alternative represents an extension of the customary method which can be simply realized and implemented with only a small amount of work and coding.

Because the first alternative is based on the RSSI of the received signals, the number of base stations in the system influences the synchronization time. For example, when the desired base station is not the base station with the strongest RSSI, time will be required to check first the channels having the stronger RSSI. In the case of three attempts per channel, it may be assumed that a time of approximately 30 ms will be required per channel.

Instead of each time two time slots per channel, in conformity with a second preferred alternative the mobile station utilizes a wide receiving window over 25 time slots each time for all channels of a carrier frequency. To this end it is assumed that the respective adjusted frequency of the receiver of the mobile station remains stable for at least 25 time slots and hence for 10,416 ms. Customarily this is the case only for receivers which operate in a so-called closed loop mode. The window is positioned in such a manner that it covers all 24 possible channels of a frequency. Once more synchronization is carried out only when, using the comparison device described with reference to the FIGS. 6 to 8, a DECT synchronization word of a base station has been found as well as the desired identification component in the subsequent A field of a received packet.

If no correspondence is found for a carrier frequency, the next carrier frequency is checked.

When a packet with the correct synchronization word and the correct identification component is found for a carrier frequency, the mobile station awaits the next identity message on this channel and carries out a new check so as to make sure that the message indeed originated from the correct base station. If it is found that it was not the correct base station and that the values correspond only by chance, the search is continued with a further window which commences exactly at the end of the synchronization word of the packet of the wrong base station. This window, however, terminates at the same time slot position as the original window; this means that it is shorter than 25 time slots. The continuation of the search after a packet has unduly been considered to be correct thus corresponds to the procedure according to the first alternative in the case of incorrectly recognized correspondence, be it that in this case 25 time slots are used instead of two.

In this case the order of the strengths of measured RSSI is not checked; a sequential check of the 10 frequencies available is performed instead.

The actual synchronization again takes place by deactivation of the receiver at an instant dictated by the correct synchronization word.

The synchronization time required hence is dependent on the frequency at which the identification message searched is transmitted and on the probability of recognition of incorrect synchronizations.

Calculations have shown that the second alternative with the comparison device in accordance with the invention can lead to a significant acceleration of the synchronization in typical circumstances. Even in extreme circumstances, in which the base stations transmit information messages only rarely (being an exceptional case), the performance is still satisfactory. Because an identity component is also detected prior to the actual synchronization and the evaluation of RSSI is dispensed with in accordance with the invention, the method in conformity with the second alternative is not subject to any significant influencing by other systems. The second alternative requires a more complex conversion than the first alternative, but offers a further enhancement of the performance.

The invention has been described for the use in a DECT system and for the packet formats customarily used in DECT systems. However, it can be used equally well for other wireless communications systems and for other packet formats.

The invention claimed is:

1. A method of synchronizing a mobile station with a base station in a wireless communications system, which method includes the following steps:
   transmission of messages by the base station via a given channel which is defined by the frequency and the time slot, at least part of the messages containing a synchronization component and an identification component which identifies the base station,
   reception of one of the messages by the mobile station,
   comparison of the synchronization component of the received message with a stored synchronization pattern and comparison of the identification component of the received message with a stored identification pattern, and
   synchronization of the mobile station with the timing underlying the received message if both two comparisons have yielded correspondence,
   wherein the mobile station carries out the comparisons in a time window which comprises all relevant time slots, the comparisons are sequentially carried out in the time window for all relevant frequencies for as long as no correspondence is found for a frequency, when correspondence is found, new comparisons with components of a subsequent message are carried out for the same frequency and in the same position of the time window, a synchronization of the mobile station in conformity with the synchronization component of the message takes place when the new comparisons reveal correspondence again, and when the repeated comparisons do not demonstrate correspondence, a window for further comparisons is positioned in such a manner that it commences directly after the beginning of the synchronization component of the first message compared in the same position and that it ends at the end of the time window used thus far.

2. A system that includes a base station, and further includes a mobile station comprising storage means, a receiving device, a comparison device and a synchronization device, said system being configured for performing the method as claimed in claim 1, and for selectively preventing, for a given one of said messages received, taking into account similarity between said one message and a stored identification pattern that would otherwise be assessed if not for the selection, in deciding whether the timing of the mobile station is to be synchronized with the timing underlying said one message.

3. A method as claimed in claim 1, characterized in that components of the received message are compared, separately from one another, with the stored synchronization pattern and with the stored identification pattern, the results of the individual comparisons being combined so as to form an overall result for the synchronization.

4. A method as claimed in claim 1, further comprising:
   storing, in the mobile station, the identification pattern, to form said stored identification pattern, and
   selecting, for the comparison with said at least one component, a part of said stored identification pattern.

5. A method as claimed in claim 1, characterized in that first the strength of received signals is measured separately for all relevant channels, the comparisons for each channel being carried out in the order of the signal strengths associated with the channels, starting with the channel having the strongest signal and each time with a predetermined number of attempts, until correspondence is found for message components with the stored synchronization pattern as well as with the stored identification pattern, the comparisons for each channel being based on the signals received within two time slots of the mobile station.

6. The use of a method as claimed in claim 1 in a DECT (Digitally Enhanced Cordless Telecommunications) system.

7. The method of claim 1, further comprising:
   forming, from said both two comparisons, a combined output value; and
   performing, subject to the formed output value, said synchronization of the timing of the mobile station with the timing underlying the received message.

8. A mobile station for a wireless communications system, which station includes
   storage means for storing a synchronization pattern and an identification pattern which identifies a given base station of the wireless communications system,
   a receiving device for receiving messages at a selected frequency,
   a comparison device which is connected to the storage means and the receiving device in order to compare a synchronization component of a received message with a synchronization pattern which is stored in the storage means and to compare an identification component of a received message with an identification pattern which is stored in the storage means, wherein the identification component identifies a base station, and
   a synchronization device which is connected to the comparison device in order to synchronize the mobile station with a synchronization component of a received message when the comparison device has detected correspondence between the synchronization and identification components of the message and a stored synchronization pattern and a stored identification pattern, respectively;
   characterized in that the comparison device includes separate comparison means for the comparison of components of a received message with a stored synchronization pattern and for the comparison of at least one component of a received message with a stored identification pattern, each of the comparison means being arranged to output an output value which indicates whether correspondence with the respective pattern has been detected, the mobile station being provided with logic means which are arranged to combine the output values of the two comparison means for each message so as to form a combined output value which indicates whether correspondence has been detected with the stored synchronization pattern as well as with the stored identification pattern.

9. A mobile station as claimed in claim 8, characterized in that it includes switching means which are arranged to supply the synchronization device either with the combined output value of the two comparison means or only with the output value of the comparison means for the comparison of components of the received message with a stored synchronization pattern, the synchronization device being suitable to determine for both cases, on the basis of the output value received, whether the message is to be used for synchronization of the mobile station.

10. A wireless communications system which includes at least one base station and at least one mobile station, the base station including a transmission device for the transmission of messages, at least part of which includes a synchronization component and an identification component which identifies the base station, the mobile station including storage means for storing a synchronization pattern and an identification pattern which identifies a given base station of the wireless communications system, a receiving device for receiving messages at a selected frequency, a comparison device which is connected to the storage means and the receiving device in order to compare the synchronization component of a received message with a synchronization pattern which is stored in the storage means and to compare the identification component of a received message with an identification pattern which is stored in the storage means, and a synchronization device which is connected to the comparison device in order to synchronize the mobile station with a synchronization component of the received message when the comparison device has detected correspondence between the synchronization and identification components of the message and the stored synchronization pattern and the stored identification pattern, respectively wherein the comparison device includes separate comparison means for the comparison of components of a received message with a stored synchronization pattern and for the comparison of at least one component of a received message with a stored identification pattern, each of the comparison means being arranged to output an output value which indicates whether correspondence with the respective pattern has been detected, the mobile station being provided with logic means which are arranged to combine the output values of the two comparison means for each message so as to form a combined output value which indicates whether correspondence has been detected with the stored synchronization pattern as well as with the stored identification pattern.

11. A wireless communications system as claimed in claim 10, characterized in that it is a DECT (Digitally Enhanced Cordless Telecommunications) system.

12. The wireless communication system of claim 10, configured such that the detecting correspondence comprises forming, from the two comparisons, an output value, and further configured for performing, subject to the formed output value, the synchronizing of the mobile station with said synchronization component of the received message.

* * * * *